United States Patent
Ueda et al.

(10) Patent No.: US 10,654,226 B2
(45) Date of Patent: May 19, 2020

(54) GAS TANK AND METHOD OF MANUFACTURING GAS TANK

(71) Applicant: TOYOTA JIDOSHA KABUSHIKI KAISHA, Toyota-shi, Aichi-ken (JP)

(72) Inventors: Naoki Ueda, Toyota (JP); Katsuki Imai, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 237 days.

(21) Appl. No.: 15/889,426

(22) Filed: Feb. 6, 2018

(65) Prior Publication Data

US 2018/0229449 A1    Aug. 16, 2018

(30) Foreign Application Priority Data

Feb. 10, 2017   (JP) .................. 2017-022976

(51) Int. Cl.
*B29C 70/20* (2006.01)
*B29C 70/34* (2006.01)
(Continued)

(52) U.S. Cl.
CPC .......... *B29C 70/207* (2013.01); *B29C 53/566* (2013.01); *B29C 53/602* (2013.01); *B29C 53/822* (2013.01); *B29C 70/30* (2013.01); *B29C 70/32* (2013.01); *B29C 70/347* (2013.01); *B29C 70/42* (2013.01); *B29C 70/682* (2013.01); *B29C 70/70* (2013.01); *B29D 22/003* (2013.01); *F17C 1/02* (2013.01); *B29K 2063/00* (2013.01); *B29K 2307/04* (2013.01); *B29K 2309/08* (2013.01); *B29K 2707/04* (2013.01); *B29K 2709/08* (2013.01);
*B29L 2031/7126* (2013.01); *F17C 2201/0109* (2013.01); *F17C 2201/056* (2013.01); *F17C 2201/058* (2013.01); *F17C 2203/012* (2013.01);
(Continued)

(58) Field of Classification Search
CPC ........... B29C 70/207; F17C 2203/0663; F17C 2203/0665; F17C 2203/067
See application file for complete search history.

(56) References Cited

U.S. PATENT DOCUMENTS

| 4,589,562 A * | 5/1986 | Fawley .................. B29C 63/24 138/104 |
|---|---|---|
| 2014/0131365 A1 | 5/2014 | Miyoshi et al. |
| 2017/0045181 A1 | 2/2017 | Watanabe et al. |

FOREIGN PATENT DOCUMENTS

| JP | 2008-304038 A | 12/2008 |
|---|---|---|
| JP | 2009-216133 | 9/2009 |

(Continued)

*Primary Examiner* — Andrew T Kirsch
(74) *Attorney, Agent, or Firm* — Finnegan, Henderson, Farabow, Garrett & Dunner, LLP

(57) ABSTRACT

A method of manufacturing a gas tank comprises: a step (a) of preparing a liner having a hollow cylindrical shape; a step (b) of forming a first layer by winding a first fiber bundle impregnated with resin around the liner; a step (c) of forming a second layer by winding a second fiber bundle impregnated with resin around the liner with the wound first fiber bundle in such a manner that portions of the second fiber bundle overlap each other in a direction parallel to a center axis of the liner; a step (d) of causing a section where the portions of the second fiber bundle overlap each other to get into the first layer; and a step (e) of curing the resin.

13 Claims, 10 Drawing Sheets

(51) Int. Cl.
- *B29C 70/32* (2006.01)
- *F17C 1/02* (2006.01)
- *B29C 53/56* (2006.01)
- *B29C 53/60* (2006.01)
- *B29C 53/82* (2006.01)
- *B29C 70/30* (2006.01)
- *B29C 70/42* (2006.01)
- *B29C 70/68* (2006.01)
- *B29C 70/70* (2006.01)
- *B29D 22/00* (2006.01)
- B29K 307/04 (2006.01)
- B29K 309/08 (2006.01)
- B29K 63/00 (2006.01)
- B29K 707/04 (2006.01)
- B29K 709/08 (2006.01)
- B29L 31/00 (2006.01)

(52) U.S. Cl.
CPC ............... *F17C 2203/0604* (2013.01); *F17C 2203/067* (2013.01); *F17C 2203/0621* (2013.01); *F17C 2203/0665* (2013.01); *F17C 2209/2154* (2013.01); *F17C 2223/0123* (2013.01); *F17C 2223/036* (2013.01)

(56) References Cited

FOREIGN PATENT DOCUMENTS

| | | |
|---|---|---|
| JP | 2012-096381 A | 5/2012 |
| JP | 2013-011305 A | 1/2013 |
| JP | 2015-000553 A | 1/2015 |
| JP | 2015-209887 | 11/2015 |

* cited by examiner

Fig.3
HOOP WINDING
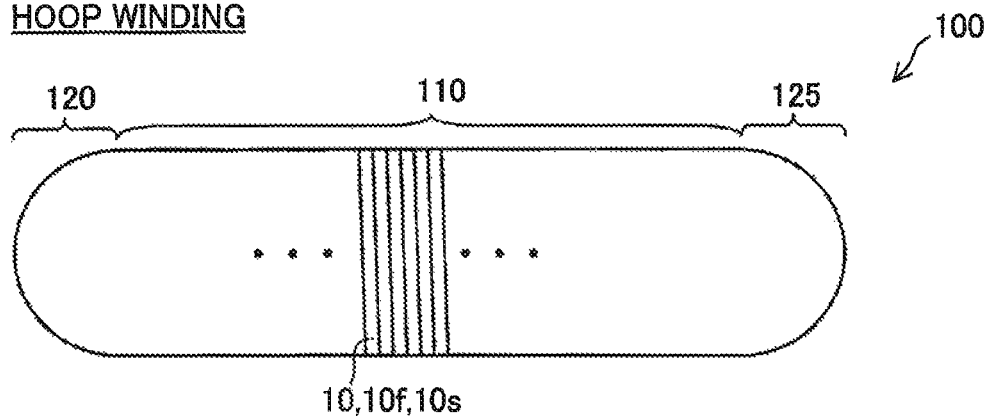
HELICAL WINDING
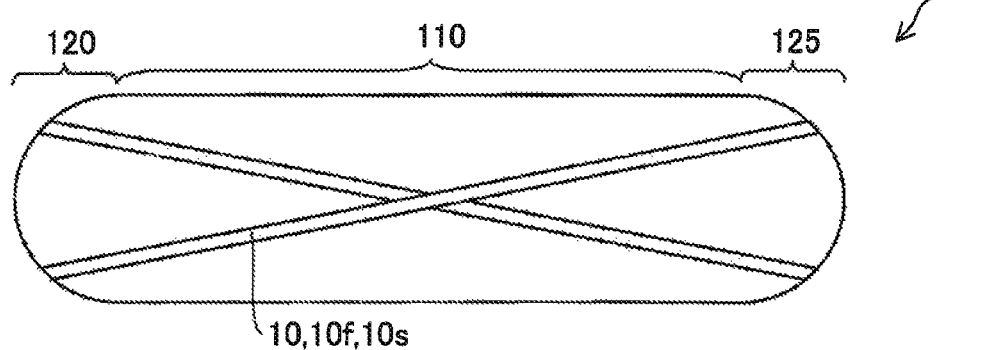

Fig.4

WINDING WAY AND TENSION IN REINFORCING LAYER

| | LAYER (VIEWED FROM LINER) | WINDING WAY | COVER RATIO | TENSION (N) |
|---|---|---|---|---|
| a | 1 to n1 | HELICAL | 100% | 5 to 15 |
| b | n1+1 to n2 | HOOP | 100% | 15 to 70 |
| c | n2+1 to n3 | HELICAL | 100% | 30 to 50 |
| d | n3+1 to n4 | HOOP | 100% | 50 to 70 |
| e | n4+1 to n5 | HELICAL | 100% | 30 to 50 |
| f | n5+1 to n6 | HOOP | 100% | 50 to 70 |
| g | n6+1 to n7 | HELICAL | 100% | 30 to 50 |
| h | n7+1 to n8 | HELICAL | 75% | 15 to 30 |
| i | n8+1 to n9 | HOOP | 100% | 50 to 70 |

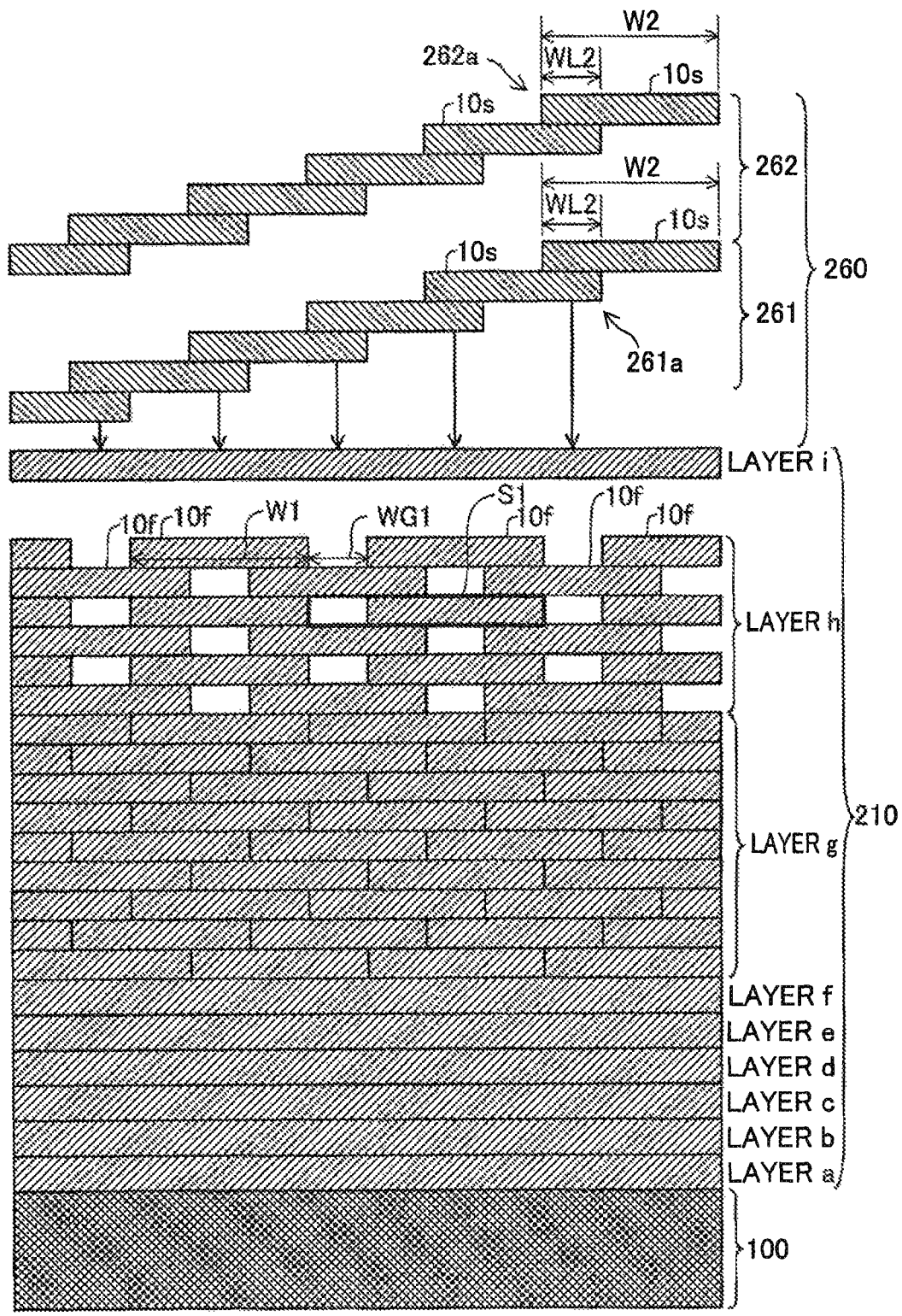

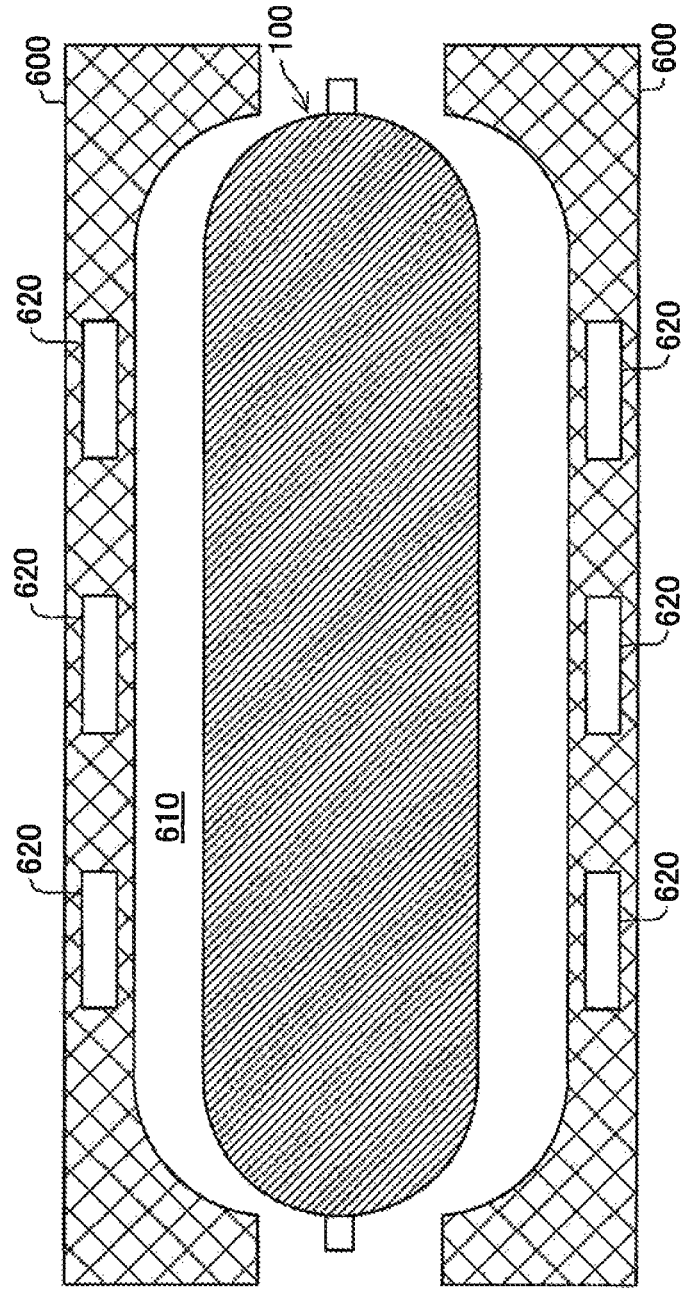

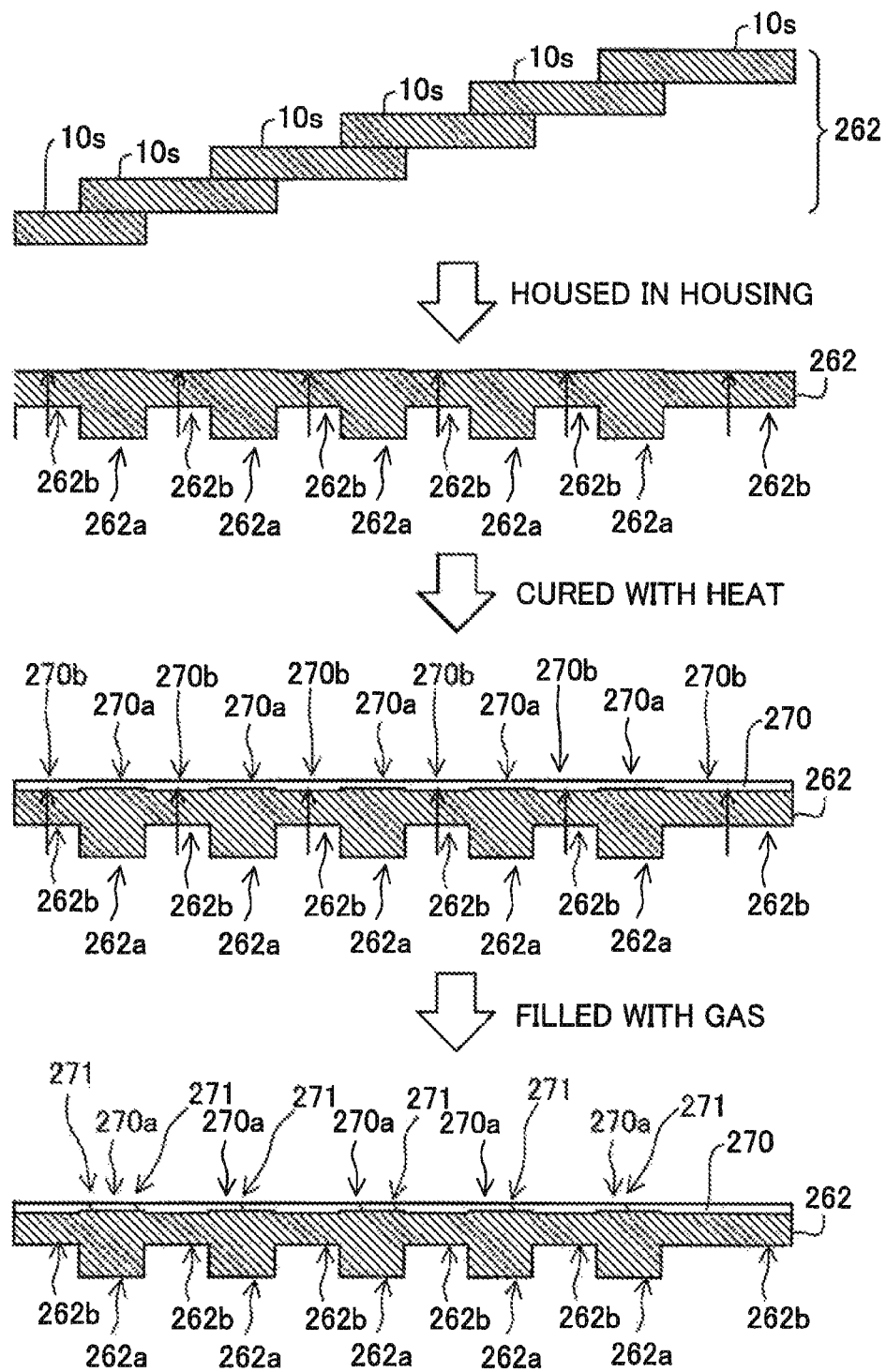

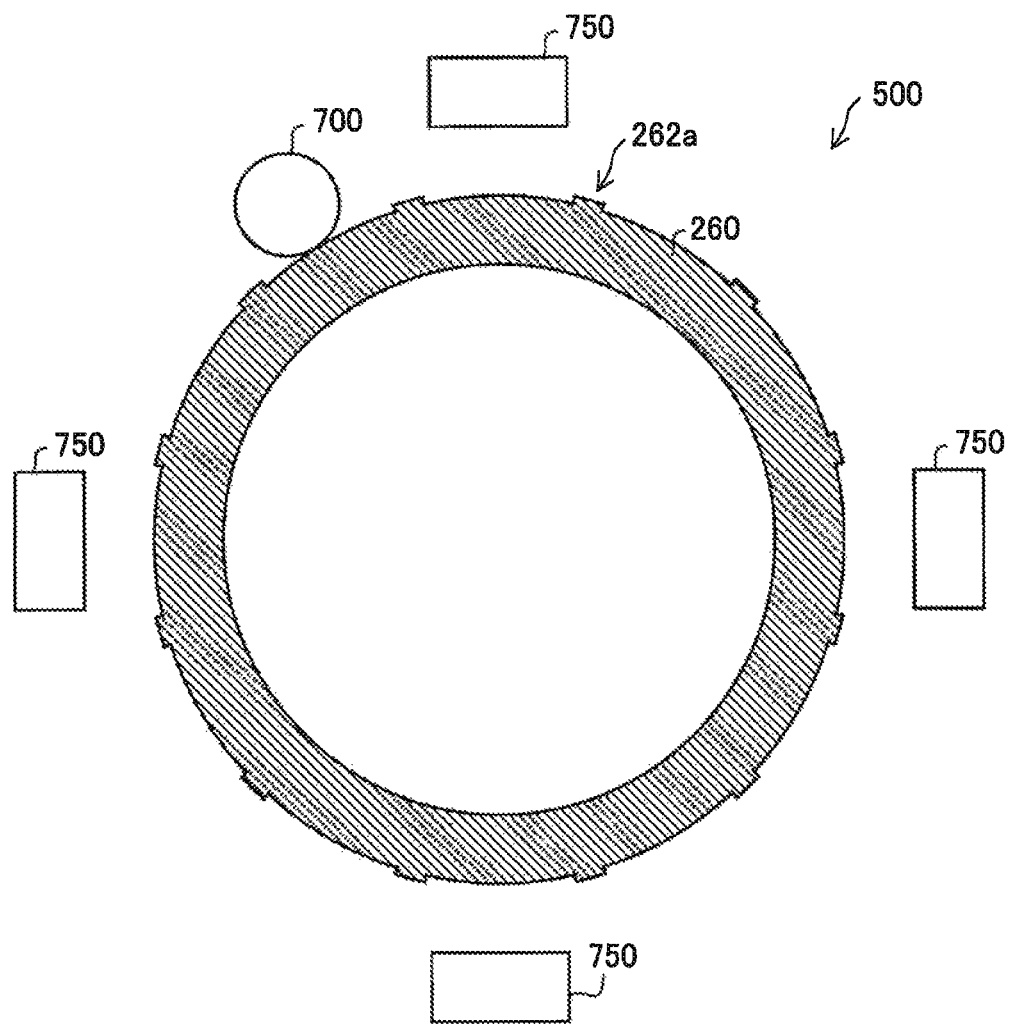

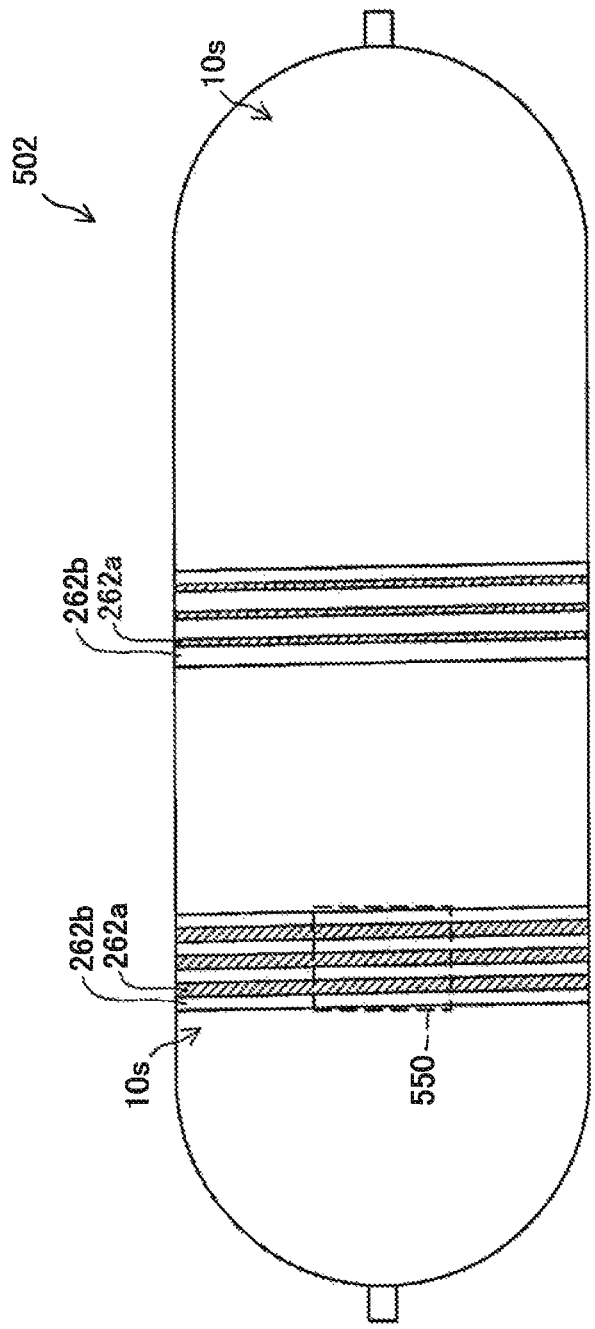

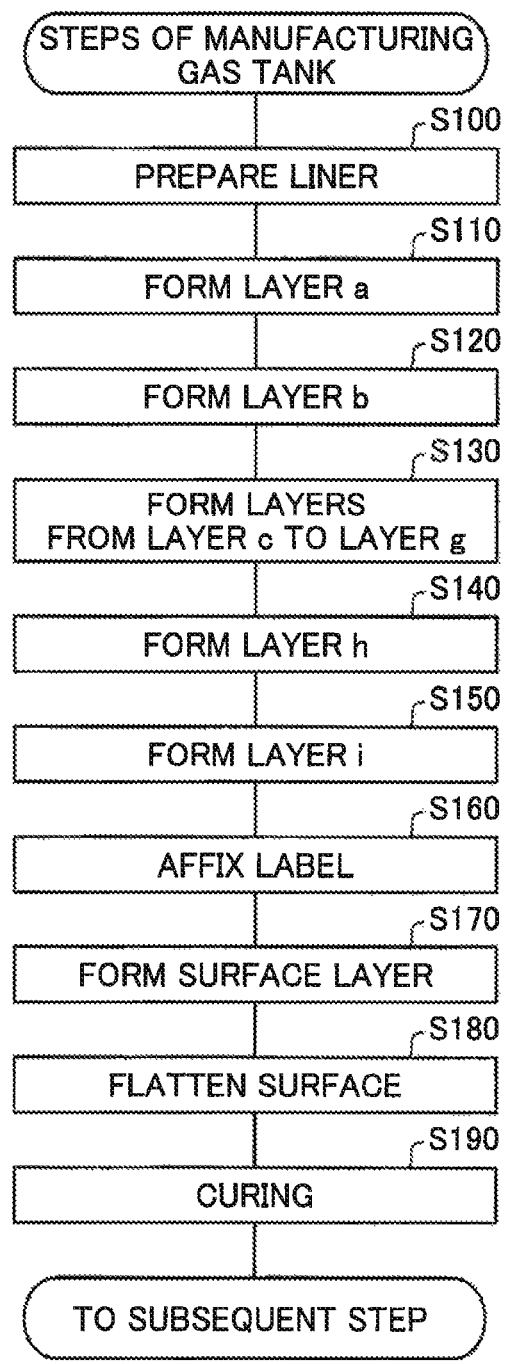

GAS TANK AND METHOD OF MANUFACTURING GAS TANK

CROSS-REFERENCE TO RELATED APPLICATIONS

This application claims priority based on Japanese Patent Application No. 2017-022976 filed on Feb. 10, 2017, the disclosure of which is incorporated herein by reference in its entirety.

BACKGROUND

Field

The present disclosure relates to a gas tank and a method of manufacturing the gas tank.

Related Art

According to a disclosure of Japanese Patent Application Publication No. 2009-216133, for manufacture of a gas tank having a reinforcing layer provided around a liner, a fiber bundle impregnated with resin is wound around the liner and then the resin is cured with heat. By doing so, the reinforcing layer made of the fiber-reinforced resin is formed.

During curing of the resin with heat, the resin added to the fiber bundle is softened once to exude to a surface of the gas tank (reinforcing layer). In this way, a resin coating film made of the resin is formed on the surface of the reinforcing layer. By the inclusion of the fiber bundle in the reinforcing layer, gas is allowed to pass through a gap in the fiber bundle in the reinforcing layer to get out of the liner from the liner. In contrast, the absence of a fiber bundle in the resin coating film prohibits permeation of gas. If gas is poured into the gas tank in this state, the gas leaks from the inside of the gas tank, passes through the liner and the reinforcing layer, and is accumulated between the reinforcing layer and the resin coating film, thereby causing a gas-filled part. If the gas-filled part ruptures, unusual sound is caused. Further, a mark caused by the rupture of the gas-filled part deteriorates appearance. According to Japanese Patent Application Publication No. 2009-216133 described above, to reduce the occurrence of such a gas-filled part, a path is formed between the liner and the reinforcing layer. Before use of the gas tank, gas is fed into the path to produce a crack in the resin coating film, thereby causing the gas leaking from the gas tank to escape to the outside of the gas tank. However, this method unfortunately involves troublesome work for manufacture including a step of forming the path between the liner and the reinforcing layer and a step of flowing gas. Hence, a simpler method for preventing the occurrence of a gas-filled part has been desired.

SUMMARY

According to one aspect of the present disclosure, a gas tank is provided. The gas tank comprises: a liner having a hollow cylindrical shape; and a fiber-reinforced resin layer formed external to the liner and including a fiber bundle impregnated with resin. The fiber-reinforced resin layer includes: a first layer formed on an outer circumference of the liner and including a first fiber bundle; and a second layer formed external to the first layer and including a second fiber bundle. In the second layer, the second fiber bundle is wound in such a manner that portions of the second fiber bundle adjacent in a direction parallel to a center axis of the liner overlap each other. A section in the second layer where the portions of the second fiber bundle overlap each other gets into the first layer.

For curing of resin with heat, the resin is softened once and then cured. According to this aspect, the section where the portions of the second fiber bundle overlap each other contains more fibers than a section without an overlap. Thus, when the resin is softened, the resin is hard to exude toward a surface of the gas tank in the section with the overlap. As a result, in the section where the portions of the second fiber bundle overlap each other, the thickness of the resin external to the second layer is reduced. If the gas tank is filled with gas in a subsequent expansion test conducted on the gas tank, a crack is caused in this section with the thin resin to release the gas through the crack. As a result, a gas-filled part is unlikely to be caused. This eliminates a step of forming a path between the liner and the first layer, so that formation of a gas-filled part is prevented more simply. Further, unusual sound due to rupture of a gas-filled part is unlikely to be caused and the appearance of the gas tank is not deteriorated.

BRIEF DESCRIPTION OF DRAWINGS

FIG. 3 is an explanatory view showing exemplary ways of winding a fiber bundle around a liner;

FIG. 4 is an explanatory view showing exemplary ways of winding a first fiber bundle in a reinforcing layer;

FIG. 5 is a schematic view showing the cross section of a straight section before the reinforcing layer and a surface layer are cured with heat;

FIG. 6 is an explanatory view showing a curing device for curing resin;

FIG. 7 is an explanatory view showing change in the state of the surface layer from curing of resin with heat to filling with gas;

FIG. 8 is an explanatory view showing a different embodiment of curing with heat;

FIG. 9 is an explanatory view showing the configuration of a gas tank in outline according to a second embodiment; and FIG. 10 is a process chart showing steps of manufacturing the gas tank.

DESCRIPTION OF EMBODIMENTS

First Embodiment

Figure 1:
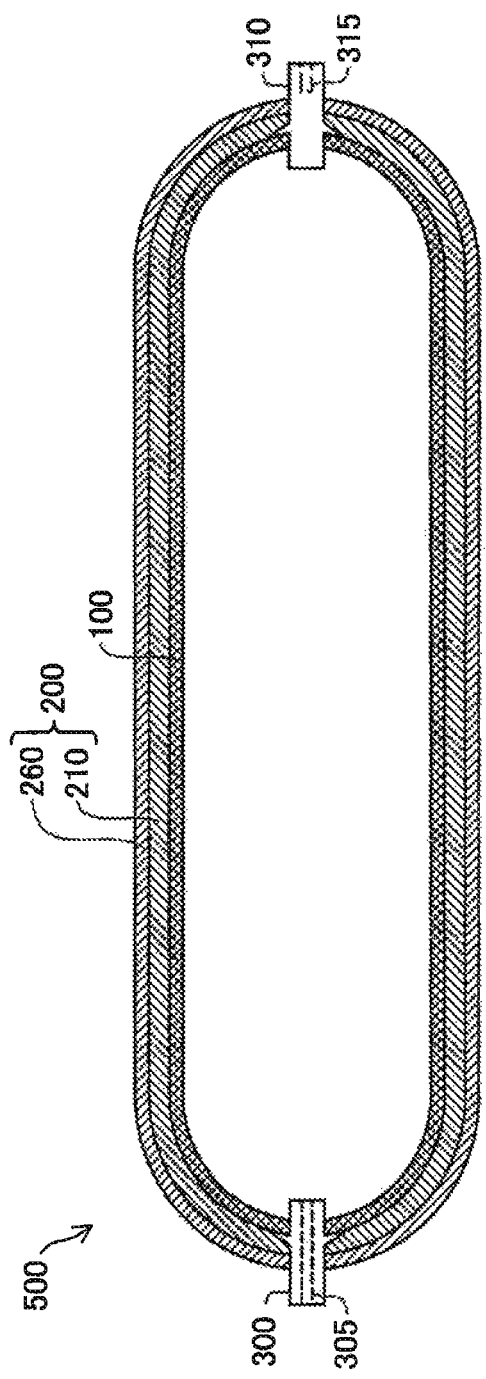
FIG. 1 is a sectional view showing the configuration of a gas tank in outline.

FIG. 1 is a sectional view showing the configuration of a gas tank 500 in outline. The gas tank 500 has a shape like a cylinder. Substantially spherical dome shapes are formed at axially opposite ends of the cylinder. The gas tank 500 includes a liner 100, and a fiber-reinforced resin layer 200 formed on the outer circumference of the liner 100. The liner 100 has a hollow cylindrical shape. The fiber-reinforced resin layer 200 includes a reinforcing layer 210 closer to the liner 100, and a surface layer 260 external to the reinforcing layer 210 and closer to outside air. The reinforcing layer 210 is a first layer and the surface layer 260 is a second layer. The reinforcing layer 210 includes a fiber bundle formed of carbon fibers. The surface layer 260 includes a fiber bundle formed of glass fibers. The fiber bundle is a bundle of a large number of fibers (single fibers). The reinforcing layer 210 reinforces the liner 100 from outside to increase the strength of the gas tank 500. The surface layer 260 protects the reinforcing layer 210 in order to prevent the occurrence of a scratch in the reinforcing layer 210. Even the occurrence of a scratch or a crack in the surface layer 260 does not affect the strength of the gas tank 500, as long as there is no scratch or crack in the reinforcing layer 210.

A mouth member 300 and a mouth member 310 are attached at the opposite ends of the gas tank 500. The mouth member 300 has a hole 305 connecting the inside and the outside of the liner 100. The mouth member 310 has a hole 315. The hole 315 does not connect the inside and the outside of the liner 100. Alternatively, like the mouth member 300, the mouth member 310 may have a hole connecting the inside and the outside of the liner 100. In this case, the hole in the mouth member 310 may be closed by a blocking member. A component for filling the gas tank 500 with gas or releasing the gas from the gas tank 500 is attached to the mouth member 300. The mouth members 300 and 310 are attached to an attachment shaft of a filament winding device described later when a fiber bundle impregnated with resin is wound around the liner 100. The mouth members 300 and 310 are used for rotation and movement of the liner 100 in various directions. The rotation mentioned herein includes rotation around the attachment shaft and rotation about an axis of rotation extending in a direction vertical to the attachment shaft. The movement mentioned herein includes movement in the direction of the attachment shaft and movement in a direction vertical to the attachment shaft.

Figure 2:
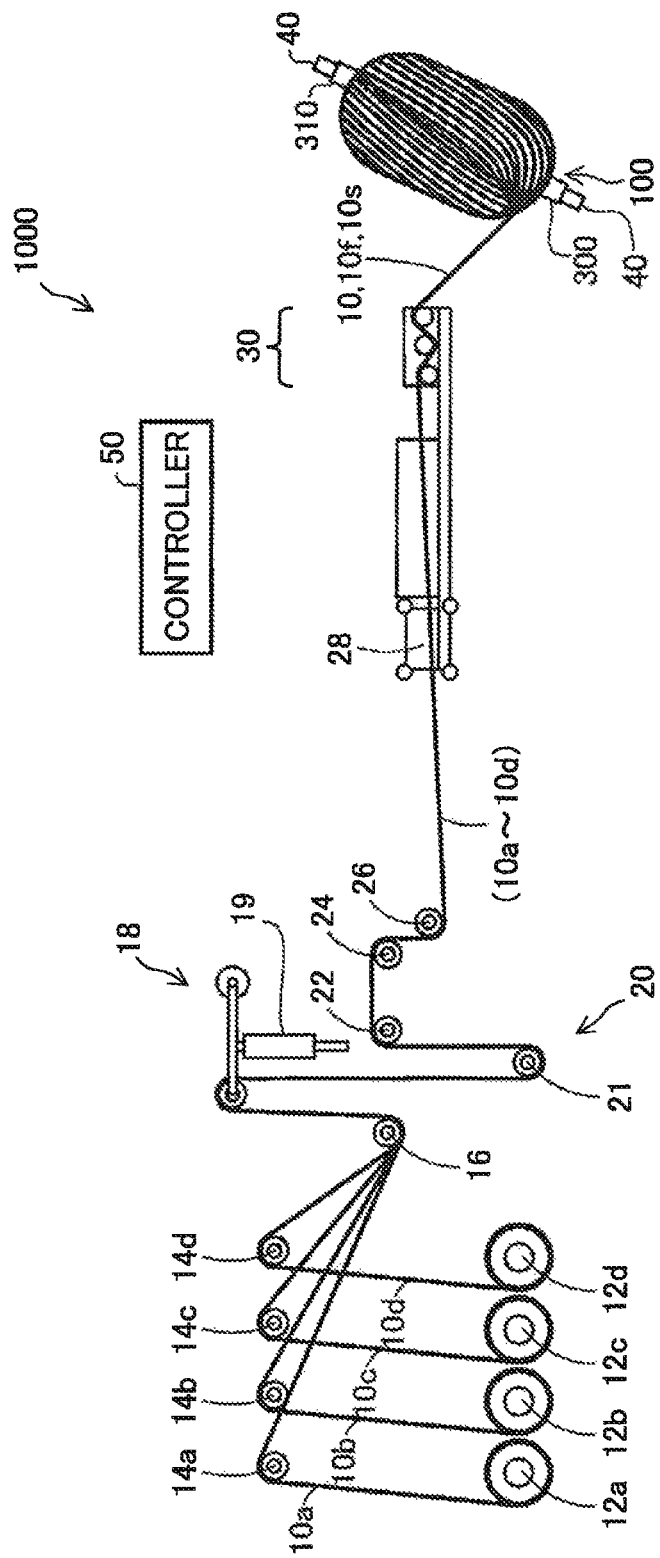
FIG. 2 is an explanatory view showing an example of a filament winding device.

FIG. 2 is an explanatory view showing an example of a filament winding device 1000. The filament winding device 1000 is to wind a fiber bundle 10 impregnated with resin around the liner 100. The filament winding device 1000 is usable for winding a fiber bundle for the reinforcing layer 210 around the liner 100 by the use of a first fiber bundle 10$f$ as the fiber bundle 10 to be fed, and for winding a fiber bundle for the surface layer 260 by the use of a second fiber bundle 10$s$ as the fiber bundle 10 to be fed.

The filament winding device 1000 includes: a delivery bobbin 12$a$, a delivery bobbin 12$b$, a delivery bobbin 12$c$, and a delivery bobbin 12$d$; a relay roller 14$a$, a relay roller 14$b$, a relay roller 14$c$, a relay roller 14$d$, and a relay roller 16; a dancer 18; an active dancer 20; a relay roller 22, a relay roller 24, and a relay roller 26; a fiber convergence tool 28; a fiber feeder 30; an attachment shaft 40; and a controller 50.

A tow-prepreg 10$a$, a tow-prepreg 10$b$, a tow-prepreg 10$c$, and a tow-prepreg 10$d$ are wound around the delivery bobbins 12$a$, 12$b$, 12$c$, and 12$d$ respectively. The delivery bobbins 12$a$, 12$b$, 12$c$, and 12$d$ function as feeders for feeding the tow-prepregs 10$a$, 10$b$, 10$c$, and 10$d$ respectively, Each of the tow-prepregs 10$a$, 10$b$, 10$c$, and 10$d$ is formed by impregnating a fiber bundle containing from about two tens of thousands to five tens of thousands of single fibers with resin such as epoxy. The tow-prepregs 10$a$, 10$b$, 10$c$, and 10$d$ may have the same number of single fibers or single fibers of different numbers. The fiber bundle in each of the tow-prepregs 10$a$, 10$b$, 10$c$, and 10$d$ is a fiber bundle formed of carbon fibers if wound for forming the reinforcing layer 210, and is a fiber bundle formed of glass fibers if wound for forming the surface layer 260. The fiber bundle may contain fibers different from carbon fibers and glass fibers. Further, resin other than epoxy may be used, A fiber bundle to be fed from each of the bobbins 12$a$, 12$b$, 12$c$, and 12$d$ may not be impregnated with resin. In this case, this fiber bundle may be impregnated with resin by being immersed into a resin bath provided on the way to the fiber feeder 30.

The relay rollers 14$a$, 14$b$, 14$c$, 14$d$, 16, 22, 24, and 26 are used for transfer of the tow-prepregs 10$a$, 10$b$, 10$c$, and 10$d$. The relay rollers 14$a$, 14$b$, 14$c$, and 14$d$ in a first stage are provided independently for the tow-prepregs 10$a$, 10$b$, 10$c$, and 10$d$ respectively. The relay rollers 16, 22, 24, and 26 in a second stage and its subsequent stages are not provided independently for the tow-prepregs 10$a$, 10$b$, 10$c$, and 10$d$ but are provided to be used in common.

The dancer 18 has a cylinder 19 set at a predetermined pressure. The active dancer 20 has a bobbin shaft 21. The active dancer 20 moves the bobbin shaft 21 so as to place the dancer 18 in a horizontal position, thereby adjusting the tension of each of the tow-prepregs 10$a$, 10$b$, 10$c$, and 10$d$. The predetermined pressure corresponds to a tension applied for winding the fiber bundle 10 around the liner 100. As described later, a tension to be applied for winding a fiber bundle differs between layers. The fiber convergence tool 28 aligns the four tow-prepregs 10$a$, 10$b$, 10$c$, and 10$d$ in order for the four tow-prepregs 10$a$, 10$b$, 10$c$, and 10$d$ to converge easily.

The fiber feeder 30 causes the four tow-prepregs 10$a$, 10$b$, 10$c$, and 10$d$ to converge into one fiber bundle 10 and feeds the one fiber bundle 10 to the liner 100 as a winding target. The fiber bundle 10 resulting from the convergence has a band-like shape with a width from about 5 to about 20 mm and a thickness from about 0.4 to about 0.8 mm, for example. The width and the thickness of the fiber bundle 10 are typically 16 mm and 0.6 mm respectively. The position of the fiber feeder 30 relative to the liner 100 is movable in a manner that depends on the position of the liner 100 and a place of the liner 100 where the fiber bundle 10 is to be wound. Where a fiber bundle for the reinforcing layer 210 and a fiber bundle for the surface layer 260 are to be distinguished from each other, the fiber bundle for the reinforcing layer 210 is called the "first fiber bundle 10$f$," and the fiber bundle for the surface layer 260 is called the "second fiber bundle 10$s$."

The attachment shaft 40 is attached to the mouth members 300 and 310 of the liner 100. The attachment shaft 40 functions as an axis of rotation when the liner 100 is rotated around the attachment shaft 40 by a driving device not shown in the drawings. The attachment shaft 40 allows rotation of the liner 100 around an axis vertical to the axis direction of the attachment shaft 40. The attachment shaft 40 further allows movement of the liner 100 in the direction of the attachment shaft 40 and allows movement of the liner 100 in a direction vertical to the attachment shaft 40, These rotations and movements realize hoop winding and helical winding described later.

The controller 50 controls operation of the active dancer 20, movement of the fiber feeder 30, and movement and rotation of the liner 100.

FIG. 3 is an explanatory view showing exemplary ways of winding a fiber bundle around the liner 100. In this embodiment, the fiber bundle 10 (first fiber bundle 10$f$ or second fiber bundle 10$f$) is wound around the liner 100 by two ways, hoop winding and helical winding. A fiber bundle 10 may be wound around the liner 100 by a way other than hoop winding and helical winding. The liner 100 includes a straight section 110 of a substantially cylindrical shape, and a semispherical dome section 120 and a semispherical dome section 125 at opposite sides of the straight section 110. Hoop winding is a winding way in which the fiber bundle 10 is wound into a circular shape along the circumference of the straight section 110 of the liner 100. In other words, hoop winding is a winding way in which the fiber bundle 10 is wound around a center axis extending in the axis direction of the cylinder of the liner 100. Hoop winding is also called "parallel winding." Helical winding is a winding way in which a fiber bundle starts to be wound from the dome section 120 of the liner 100 to reach the other dome section 125 across the straight section 110. In other words, helical winding is a winding way in which the fiber bundle is wound around a center axis extending in a direction vertical to the axis of the cylinder of the liner 100. The helical winding shown in FIG. 3 is low-angle helical winding and is also called "label winding."

FIG. 4 is an explanatory view showing exemplary ways of winding the first fiber bundle 10$f$ in the reinforcing layer 210. The reinforcing layer 210 includes nine layers from a layer a to a layer i. Layers from the layer a to a layer g correspond to an inner layer, whereas a layer h and the layer i correspond to an external layer. The external layer is formed external to the inner layer. The layer a includes layers from a first layer to an (n1)-th layer as viewed from the liner 100. The layer a is formed by helical winding. A layer formed by helical winding is called a "helical layer." The layer a has a cover ratio of about 100%. A tension applied during winding of the first fiber bundle 10$f$ for forming the layer a is from about 5 to about 15 N. A cover ratio is an index indicating a volume constituted by the first fiber bundle 10$f$ relative to the volume of space where the first fiber bundle 10$f$ is to be wound. The cover ratio being 100% means that the first fiber bundle 10$f$ is wound tightly. The cover ratio will be described in detail later. Numbers n1 to n9 shown in FIG. 4 are integers. The following relationship is established about these numbers: n1 is 1 or more, and n1<n2<n3<n4<n5<n6<n7<n8<n9. If n1=1, the layer a includes only one layer.

The layer b includes layers from an (n1+1)-th layer to an (n2)-th layer as viewed from the liner 100. The layer b is formed by hoop winding. The layer formed by hoop winding is also called a "hoop layer." The layer b has a cover ratio of about 100%. A tension applied during winding of the first fiber bundle 10$f$ for forming the layer b is from about 15 to about 70 N. The layers from the layer c to the layer g will not be described. The inner layer (from the layer a to the layer g) has a cover ratio of substantially 100% and is usable for reinforcing the liner 100.

The layer h includes layers from an (n7+1)-th layer to an (n8)-th layer as viewed from the liner 100. The layer h is formed by helical winding in such a manner that portions of the first fiber bundle 10$f$ adjacent in a direction of the winding around the center axis of the liner 100 are spaced apart by a gap. The layer h has a cover ratio of about 75%. A tension applied during winding of the first fiber bundle 10$f$ for forming the layer h is from about 15 to about 30 N. The cover ratio being 75% means that the first fiber bundle 10$f$ is wound while a gap is formed in the first fiber bundle 10$f$, and that the volume of space where the first fiber bundle 10$f$ is wound includes the first fiber bundle 10$f$ constituting 75% of the volume and a gap constituting 25% of the volume. The external layer includes the layer h formed by winding the first fiber bundle 10$f$ while forming a gap in the first fiber bundle 10$f$.

The layer i includes layers from an (n8+1)-th layer to an (n9)-th layer as viewed from the liner 100. The layer i functions to fix the shape of the surface of the reinforcing layer 210 and is formed by hoop winding. The layer i has a cover ratio of about 100%. A tension applied during winding of the first fiber bundle 10$f$ for forming the layer i is from about 50 to about 70 N. The layer i may be a single layer. In this case, n9=n8+1 is established. The layer i may be omitted.

FIG. 5 is a schematic view showing the cross section of the straight section 110 before the reinforcing layer 210 and the surface layer 260 are cured with heat. In FIG. 5, layers from the layer a to the layer h are formed of the first fiber bundle 10$f$. The layers from the layer a to the layer f are each formed of a single layer or multiple layers. However, for the convenience of illustration, these layers are simply illustrated as a single layer.

The cover ratio is calculated based on the ratio of the first fiber bundle 10$f$ in a cross section S1 of FIG. 5 including multiple layers arranged in a stacking direction of the first fiber bundle 10$f$. The cross section S1 is a value about a cross section at the straight section 110, not a cross section at each of the dome sections 120 and 125 in FIG. 3. The arrangement of the first fiber bundle 10$f$ is simpler at the straight section 110 than at each of the dome sections 120 and 125, so that the cover ratio at the straight section 110 is calculated easily than that at each of the dome sections 120 and 125. For this reason, the cover ratio is calculated based on the way of winding the first fiber bundle 10$f$ at the straight section 110. Assuming that the width of the first fiber bundle 10$f$ is W1, in the layer h, the first fiber bundle 10$f$ is wound while a gap of a size WG1 is formed in the first fiber bundle 10$f$. Thus, the cover ratio in the layer h is calculated as 100*W1/(W1+WG1) (in percent). Assuming that the size WG1 of the gap is about 33.3% of the width W1 of the first fiber bundle 10$f$, the cover ratio is determined to be about 75%.

The surface layer 260 is formed of the second fiber bundle 10$s$ and includes two layers, a first surface layer 261 and a second surface layer 262. In this embodiment, the surface layer 260 includes two layers. Alternatively, the surface layer 260 may include multiple layers including three or more layers. In the illustration of FIG. 5, in the surface layer 260, the second fiber bundle 10$s$ is wound in such a manner that portions of the second fiber bundle 10$s$ adjacent in a direction parallel to the center axis of the liner 100 overlap each other. A section where these portions of the second fiber bundle 10$s$ overlap each other is called a first section 261$a$ or a first section 262$a$. An overlap percent is an index indicating a degree of an overlap between adjacent portions of the fiber bundle 10. In the illustration of FIG. 5, the second fiber bundle 10$s$ forming the surface layer 260 has a width W2 and an overlap between adjacent portions of the second fiber bundle 10$s$ is WL2. In this case, the overlap percent of the second fiber bundle 10$s$ is defined as 100*WL2/W2 (in percent). In the illustration of FIG. 5, the overlap percent of the second fiber bundle 10$s$ is about 33.3%. In this embodiment, the size WG1 of a gap in the first fiber bundle 10$f$ is typically about 33.3% of the width W1 of the first fiber bundle 10$f$, and the overlap percent of the second fiber bundle 10$s$ is typically about 33.3% of the width W2 of the second fiber bundle 10$s$. Meanwhile, the size WG1 of a gap in the first fiber bundle 10$f$ may be set to be from 5 to 33.3% of the width W1 of the first fiber bundle 10$f$. Further, the overlap percent may be set to be from 5 to 33.3% of the width W2 of the second fiber bundle 10$s$. By doing so, the layer i and each of the first sections 261$a$ and 262$a$ in the surface layer 260 where portions of the second fiber bundle 10$s$ overlap each other are caused to get into a gap formed in the layer h of the reinforcing layer 210 easily, so that an external surface of the surface layer 260 is flattened easily.

As described by referring to FIG. 4, a tension applied for winding the first fiber bundle 10$f$ for forming the layer h is lower than a tension applied for winding the first fiber bundle 10$f$ for forming the inner layer. Thus, the layer i and the first section 261a and 262a in the surface layer 260 where portions of the second fiber bundle 10s overlap, each other are caused to get into a gap formed in the layer h of the reinforcing layer 210 easily, so that the external surface of the surface layer 260 is flattened easily.

In this embodiment, the cover ratio of the first fiber bundle 10f in the layer h is set to be lower than 100%, for example, at about 75%, thereby causing the layer i and each of the first sections 261a and 262a where portions of the second fiber bundle 10s overlap each other to get into a gap formed in the layer h of the reinforcing layer 210 easily. This may also be achieved by reducing the turns and the density of the first fiber bundle 10f to be wound for forming the layer h or by increasing the volume ratio of resin in the first fiber bundle 10f.

To cause the layer i and each of the first sections 261a and 262a where portions of the second fiber bundle 10s overlap each other to get into a gap formed in the layer h of the reinforcing layer 210 easily to flatten the external surface of the surface layer 260 easily, at least one of the following three ways may be followed during winding of the first fiber bundle 10f for forming the layer h: (a) to reduce the cover ratio of the first fiber bundle 10f compared to its cover ratio during winding for forming the inner layer (layers from the layer a to the layer g); (b) to reduce the turns and the density of the first fiber bundle 10f or increase the volume ratio of resin in the first fiber bundle 10f; and (c) to reduce a tension to be applied for winding the first fiber bundle 10f compared to a tension to be applied for winding for forming the inner layer.

FIG. 6 is an explanatory view showing a curing device 600 for curing resin. The resin curing device 600 is a hollow mold with a housing 610 to house the liner 100 inside with the wound fiber bundle 10 (first fiber bundle 10f or second fiber bundle 10s), and heaters 620 for heating the housing 610. The size of the housing 610 is substantially the same as the liner 100 with the wound fiber bundle 10. In this embodiment, the liner 100 with the wound fiber bundle 10 is housed in the housing 610 and heated by the heaters 620. The heaters 620 heat the liner 100 to a softening temperature of resin first to soften the resin in the fiber bundle 10. The softening temperature differs between resins and is from 50 to 80 degrees C., for example. Then, the heaters 620 heat the liner 100 to a curing temperature to cure the resin. The curing temperature differs between resins and is from 130 to 170 degrees C., for example. The housing 610 has a smooth inner surface, thereby smoothening the surface of the gas tank 500 to be formed (FIG. 1).

FIG. 7 is an explanatory view showing change in the state of the surface layer 260 from curing of resin with heat to filling with gas. FIG. 7 shows only the second surface layer 262 as an outermost layer of the surface layer 260. The liner 100 with the wound second fiber bundle 10s is thick at the first section 262a in the second surface layer 262 where portions of the fiber bundle 10 overlap each other, and is thinner at a second section 262b where portions of the second fiber bundle 10s do not overlap each other than at the first section 262a. When the liner 100 is housed in the curing device 600 and then the curing device 600 is closed, the first section 262a is pressed with the inner surface of the housing 610. This makes a front surface of the first section 262a substantially flat to make the first section 262a move toward the layer h shown in FIG. 5.

Next, heat is applied to increase a temperature inside the curing device 600 to the softening temperature. This softens the resin in the first fiber bundle 10f forming the layers from the layer a to the layer h and the resin in the second fiber bundle 10s to make the resin exude toward an external surface of the second surface layer 262, thereby forming a surface resin layer 270. The first section 262a is thicker than the second section 262b and contains more fibers than the second section 262b. Thus, at this time, the resin does not pass through the first section 262a easily, so that the amount of exudation of the resin is small. As a result, a surface resin layer 270a on the external surface at the first section 262a is thinner than a surface resin layer 270b on the external surface at the second section 262b. The external surface of the surface resin layer 270 becomes a smooth surface without unevenness as a result of the flat inner surface of the curing device 600. Then, the curing device 600 applies heat to increase the temperature of the housing 610 to the curing temperature, thereby curing the resin. Next, the curing device 600 is opened and the gas tank 500 is taken out of the housing 610 and cooled, thereby completing formation of the gas tank 500.

Next, a component for gas filling is attached to the mouth member 300. Then, the gas tank 500 is filled with gas and an expansion test is conducted on the gas tank 500. During the test, a pressure inside the gas tank 500 is increased to cause a crack 271 in the thin surface resin layer 270a. As described above, the surface layer 260 is to protect the reinforcing layer 210 from a scratch, etc. Thus, even the occurrence of the crack 271 in the surface resin layer 270 does not affect the strength of the gas tank 500.

In the gas tank 500 of the first embodiment, the second fiber bundle 10s is wound in the surface layer 260 in such a manner that portions of the second fiber bundle 10s adjacent in a direction parallel to the center axis of the liner 100 overlap each other. Each of the first sections 261a and 262a in the surface layer 260 where these portions of the second fiber bundle 10s overlap each other gets into the reinforcing layer 210. Fibers in the second fiber bundle 10s are arranged densely in each of the first sections 261a and 262a in the surface layer 260 where these portions of the second fiber bundle 10s overlap each other. This makes it difficult for resin to exude toward a surface to reduce the thickness of the surface resin layer 270. A crack is caused easily in the resultant thin surface resin layer 270a. Even if gas leaking from the gas tank 500 comes in between the surface layer 260 and the surface resin layer 270, the occurrence of a gas-filled part is prevented by the presence of the crack 271 in the thin surface resin layer 270a. Preventing the occurrence of a gas-filled part prevents the occurrence of unusual sound due to rupture of a gas-filled part or deterioration of the appearance of the gas tank due to a mark of the rupture. Additionally, there arises no need to execute a step of forming a path for passage of a gas between the liner 100 and the reinforcing layer 210.

In the first embodiment, the reinforcing layer 210 includes the inner layer (layers from the layer a to the layer g, for example) closer to the liner 100, and the external layer (layer h, for example) closer to the surface layer 260. In the external layer (layer h), the first fiber bundle 10f is wound while a gap is formed in the first fiber bundle 10f. This achieves reinforcement of the liner 100 at the inner layer (layers from the layer a to the layer g). Further, as the first fiber bundle 10f is wound in the external layer while a gap is formed in the first fiber bundle 10f, each of the first sections 261a and 262a in the surface layer 260 where portions of the second fiber bundle 10s overlap each other gets into a gap in the first fiber bundle 10f in the external layer easily. As a result, the surface of the gas tank 500 is flattened easily. The first section 262a where portions of the second fiber bundle 10s overlap each other is flattened with the inner surface of the housing 610 during curing of resin. Thus, the first fiber bundle 10f is not required to be wound so as to form a gap in the first fiber bundle 10f.

In the first embodiment, the external surface (layer h) under the surface layer 260 is a helical layer formed by winding the first fiber bundle 10f by helical winding while forming a gap in the first fiber bundle 10f. In the helical layer, the first fiber bundle 10f is supported at the two dome sections 120 and 125. Further, the straight section 110 has a long axial length, so that the first fiber bundle 10f is caused to move easily in the circumferential direction. Thus, if force is applied from the outside of the straight section 110 to act radially toward the center, the second fiber bundle 10s in the surface layer 260 gets into a gap in the first fiber bundle 10f in the layer h easily, so that the surface of the gas tank 500 is flattened easily. The first fiber bundle 10f in the layer h may be wound by a winding way such as hoop winding, for example, other than helical winding.

In the first embodiment, the first fiber bundle 10f in the reinforcing layer 210 is formed of carbon fibers of high strength. This achieves more reliable reinforcement of the gas tank 500. Further, glass fibers less expensive than carbon fibers are usable for the second fiber bundle 10s in the surface layer 260 not required to have very high strength. Meanwhile, a fiber bundle in the surface layer 260 may be formed of carbon fibers.

In the first embodiment, in the straight section 110 of the liner 100, the first fiber bundle 10f in the external layer of the reinforcing layer 210 is wound so as to form a gap of a size from 5 to 33.3% of the width of the first fiber bundle 10f. Further, the second fiber bundle 10s in the surface layer 260 is wound so as to form an overlap having an overlap percent from 5 to 33.3%. Thus, the first section 262a in the surface layer 260 where portions of the second fiber bundle 10s overlap each other is caused to get into a gap in the first fiber bundle 10f in the reinforcing layer 210 easily. As a result, the surface of the gas tank 500 is flattened easily.

Different Embodiment

FIG. 8 is an explanatory view showing a different embodiment of curing with heat. In the first embodiment, the liner 100 with the wound fiber bundle 10 (first fiber bundle 10f or second fiber bundle 10f) is housed in the housing 610 of the curing device 600. Then, resin in the liner 100 is softened to cause the first section 262a where portions of the second fiber bundle 10s overlap each other to get into the reinforcing layer 210. Then, the resin is cured. In a different embodiment, while the liner 100 with the wound fiber bundle 10 is heated to a softening temperature by heaters 750, the surface of the liner 100 with the wound fiber bundle 10 is smoothened with a roller 700 to flatten the surface. Specifically, the first section 262a in the surface layer 260 where portions of the second fiber bundle 10s overlap each other is caused to get into the reinforcing layer 210 by using the roller 700. Next, the liner 100 with the wound fiber bundle 10 is heated to a curing temperature by the heaters 750 to cure the resin. This achieves curing of the resin in the gas tank 500 without use of the curing device 600. While the roller 700 is used in this embodiment, the roller 700 may be replaced by a flattening tool such as a spatula. Alternatively, by increasing a tension to be applied for winding the second fiber bundle 10s, each of the first sections 261a and 262a in the surface layer 260 where portions of the second fiber bundle 10s overlap each other may be caused to get into a gap in the first fiber bundle 10f in the reinforcing layer 210.

Second Embodiment

FIG. 9 is an explanatory view showing the configuration of a gas tank in outline according to a second embodiment. A gas tank 502 of the second embodiment has the same configuration as that of the first embodiment. FIG. 9 shows a label 550. While not described in the first embodiment, the label 550 is also provided to the gas tank 500 of the first embodiment. The label 550 indicates a date of manufacture of the gas tank 502, an expiration date of use of the gas tank 502, purpose of the gas tank 502, etc. To prevent rewrite of the label 550, the label 550 is affixed between the reinforcing layer 210 and the surface layer 260. In the first embodiment, for formation of the surface layer 260 after affixing of the label 550, the ratio of the first section 262a in the surface layer 260 where portions of the second fiber bundle 10s overlap each other (overlap percent) is substantially constant, regardless of whether or not the overlap percent is determined in a place above the label 550. In contrast, the second embodiment differs from the first embodiment in that, for formation of the surface layer 260 after affixing of the label 550, the second fiber bundle 10s in the surface layer 260 is wound in such a manner that the ratio of the first section 262a in the surface layer 260 where portions of the second fiber bundle 10s overlap each other (overlap percent) becomes greater in a place above the label 550 than in a place other than the place above the label 550. A small overlap percent may cause risk of displacing the fiber bundle 10 to make the label 550 rewritable. In the second embodiment, a percent of an overlap between portions of the second fiber bundle 10s in the surface layer 260 is greater in a place above the label 550 than in a place other than the place above the label 550. This makes it possible to reduce the likelihood of intentional rewrite of the label 550, compared to the first embodiment.

FIG. 10 is a process chart showing steps of manufacturing the gas tank 500. In step S100, the liner 100 with the mouth members 300 and 310 is prepared. In step S110, the mouth members 300 and 310 are attached to the attachment shaft 40. Next, the controller 50 winds the first fiber bundle 10f while rotating the liner 100 around the attachment shaft 40, thereby forming the layer a. The layer a is formed by helical winding. For the helical winding, the controller 50 moves the fiber feeder 30 rapidly in the direction of the attachment shaft 40 while rotating the liner 100. For example, the controller 50 moves the fiber feeder 30 back and forth from the mouth member 300 to the other mouth member 310 and then to the mouth member 300 before the liner 100 makes one rotation. While the controller 50 moves the fiber feeder 30 in this embodiment, the controller 50 may alternatively move the attachment shaft 40. For the heavy weight of the liner 100, however, moving the fiber feeder 30 is more preferable.

In step S120, the controller 50 forms the layer b. The layer b is formed by hoop winding. For the hoop winding, the controller 50 rotates the liner 100 while moving the fiber feeder 30 slowly in the direction of the attachment shaft 40. For example, the controller 50 causes the liner 100 to make several tens of rotations or more while moving the fiber feeder 30 from the mouth member 300 to the other mouth member 310. In step S130, like steps S110 and S120 described above, layers from the layer c to the layer g are formed by following the ways of winding explained by referring to FIG. 4.

In step S140, the layer h is formed. The layer h is formed by helical winding. In consideration of the width of the first fiber bundle 10f, the controller 50 controls the rotation speed of the liner 100 and the speed of move of the fiber feeder 30 in such a manner that adjacent portions of the first fiber bundle 10f are spaced apart by a gap. In step S150, the layer i is formed.

In step S160, the label 550 is affixed on the layer i. This step is omissible if the label 550 is not to be affixed.

In step S170, the surface layer 260 is formed using the second fiber bundle 10s. In consideration of the width of the second fiber bundle 10s, the controller 50 controls the rotation speed of the liner 100 and the speed of move of the fiber feeder 30 in such a manner that adjacent portions of the second fiber bundle 10s partially overlap each other.

In step S180, the surface of the second fiber bundle 10s is flattened. This causes each of the first sections 261a and 262a in the surface layer 260 where portions of the second fiber bundle 10s overlap each other to get into the gap in the first fiber bundle 10f in the reinforcing layer 210. In step S190, resin in the fiber bundle 10 is cured to complete formation of the gas tank 500. Steps S180 and S190 may be executed simultaneously. After step S190, a subsequent step such as a test step is executed.

The present disclosure is not limited to the above-described embodiments or different embodiments but is feasible in the form of various configurations within a range not deviating from the substance of the disclosure. For example, technical features in the embodiments or those in the different embodiments corresponding to those in each of the aspects described in SUMMARY can be replaced or combined, where appropriate, with the intention of solving some or all of the aforementioned problems or achieving some or all of the aforementioned effects. Unless being described as absolute necessities in this specification, these technical features may be deleted, where appropriate.

The present disclosure has been made to solve at least some of the above-described problems and is feasible as the following aspects.

According to one aspect of the present disclosure, a gas tank is provided. The gas tank comprises: a liner having a hollow cylindrical shape; and a fiber-reinforced resin layer formed external to the liner and including a fiber bundle impregnated with resin. The fiber-reinforced resin layer includes: a first layer formed on an outer circumference of the liner and including a first fiber bundle; and a second layer formed external to the first layer and including a second fiber bundle. In the second layer, the second fiber bundle is wound in such a manner that portions of the second fiber bundle adjacent in a direction parallel to a center axis of the liner overlap each other. A section in the second layer where the portions of the second fiber bundle overlap each other gets into the first layer.

For curing of resin with heat, the resin is softened once and then cured. According to this aspect, the section where the portions of the second fiber bundle overlap each other contains more fibers than a section without an overlap. Thus, when the resin is softened, the resin is hard to exude toward a surface of the gas tank in the section with the overlap. As a result, in the section where the portions of the second fiber bundle overlap each other, the thickness of the resin external to the second layer is reduced. If the gas tank is filled with gas in a subsequent expansion test conducted on the gas tank, a crack is caused in this section with the thin resin to release the gas through the crack. As a result, a gas-filled part is unlikely to be caused. This eliminates a step of forming a path between the liner and the first layer, so that formation of a gas-filled part is prevented more simply. Further, unusual sound due to rupture of a gas-filled part is unlikely to be caused and the appearance of the gas tank is not deteriorated.

In the above-described aspect, the first layer may include multiple layers, and the multiple layers may include at least one layer in which the first fiber bundle is wound in such a manner that the adjacent portions of the first fiber bundle are spaced apart.

This aspect provides the layer in which the first fiber bundle is wound in such a manner that a gap is formed in the first fiber bundle. This causes the section where the portions of the second fiber bundle overlap each other to get into the gap easily, so that a surface of the second layer is flattened easily.

In the above-described aspect, the first layer may include an inner layer closer to the liner and an external layer external to the inner layer, and the external layer may include a layer in which the first fiber bundle is wound in such a manner that the adjacent portions of the first fiber bundle are spaced apart.

This aspect achieves reinforcement of the liner at the inner layer. Further, as the first fiber bundle is wound in the external layer while the gap is formed in the first fiber bundle, the section in the second layer where the portions of the second fiber bundle overlap each other gets into the gap in the first fiber bundle easily. As a result, the surface of the gas tank is flattened easily.

In the above-described aspect, the first layer may include multiple layers including an inner layer closer to the liner and an external layer external to the inner layer, and the external layer may include a layer in which resin in the first fiber bundle has a larger volume ratio than the resin in the first fiber bundle in the inner layer.

This aspect achieves reinforcement of the liner at the inner layer. Further, the external layer includes the layer in which the resin in the first fiber bundle has a larger volume ratio than the resin in the first fiber bundle in the inner layer. This allows softening of the external layer. As a result, the section in the second layer where the portions of the second fiber bundle overlap each other gets into the gap in the first fiber bundle easily, so that the surface of the gas tank is flattened easily.

In the above-described aspect, the external layer may include a helical layer in which the first fiber bundle is wound by helical winding.

In this aspect, the external surface under the second layer is a helical layer formed by winding the first fiber bundle by helical winding. In the helical layer, the first fiber bundle moves easily in a circumferential direction. This causes the second fiber bundle to get into the gap in the first fiber bundle easily so that the surface of the gas tank is flattened easily.

In the above-described aspect, the first fiber bundle may be formed of carbon fibers, and the second fiber bundle may be formed of glass fibers.

In this aspect, the fiber bundle in the first layer is formed of carbon fibers of high strength. This achieves more reliable reinforcement of the gas tank. Further, glass fibers less expensive than carbon fibers are usable for the second layer not required to have very high strength.

In the above-described aspect, a label may be further provided between the first layer and the second layer. A percent of an overlap between the adjacent portions of the second fiber bundle in the second layer may be greater in a place above the label than in a place other than the place above the label.

In this aspect, the overlap percent is greater in a place above the label than in a place other than the place above the label. This makes it possible to reduce the likelihood of intentional rewrite of the label.

According to one aspect of the present disclosure, a method of manufacturing a gas tank is provided. The method comprises the steps of: a step (a) of preparing a liner having a hollow cylindrical shape; a step (b) of forming a first layer by winding a first fiber bundle impregnated with resin around the liner; a step (c) of forming a second layer by winding a second fiber bundle impregnated with resin around the liner with the wound first fiber bundle in such a manner that portions of the second fiber bundle overlap each other in a direction parallel to a center axis of the liner; a step (d) of causing a section where the portions of the second fiber bundle overlap each other to get into the first layer; and a step (e) of curing the resin.

For curing of resin with heat, the resin is softened once and then cured. According to this aspect, the section where the portions of the second fiber bundle overlap each other contains more fibers than a section without an overlap. Thus, when the resin is softened, the resin is hard to exude toward a surface of the gas tank in the section with the overlap. As a result, in the section where the portions of the second fiber bundle overlap each other, the thickness of the resin external to the second layer is reduced. If the gas tank is filled with gas in a subsequent expansion test conducted on the gas tank, a crack is caused in this section with the thin resin to release the gas through the crack. As a result, a gas-filled part is unlikely to be caused. This eliminates a step of forming a path between the liner and the first layer, so that formation of a gas-filled part is prevented more simply. Further, unusual sound due to rupture of a gas-filled part is unlikely to be caused and the appearance of the gas tank is not deteriorated.

The present disclosure is feasible in various aspects. These aspects include a gas tank, and a method of manufacturing the gas tank, for example.

What is claimed is:

1. A gas tank comprising:
    a liner having a hollow cylindrical shape; and
    a fiber-reinforced resin layer formed external to the liner and including a fiber bundle impregnated with resin, wherein the fiber-reinforced resin layer includes:
        a first layer formed on an outer circumference of the liner and including a first fiber bundle; and
        a second layer formed external to the first layer and including a second fiber bundle, wherein
        the first layer includes an inner layer and an external layer, the inner layer being closer than the external layer to the liner, the external layer being external to the inner layer, and the external layer including a layer having a spaced-apart section in which the first fiber bundle is wound in such a manner that adjacent portions of the first fiber bundle are spaced apart,
        the second layer includes an overlapped section in which the second fiber bundle is wound in such a manner that portions of the second fiber bundle adjacent in a direction parallel to a center axis of the liner overlap each other, and
        the overlapped section of the second layer gets into the spaced-apart section of the external layer.

2. The gas tank in accordance with claim 1, wherein the external layer includes a helical layer in which the first fiber bundle is wound by helical winding.

3. The gas tank in accordance with claim 1, wherein the external layer includes a layer in which resin in the first fiber bundle has a larger volume ratio than the resin in the first fiber bundle in the inner layer.

4. The gas tank in accordance with claim 1, wherein the first fiber bundle is formed of carbon fibers, and the second fiber bundle is formed of glass fibers.

5. The gas tank in accordance with claim 1, further comprising a label provided between the first layer and the second layer, wherein
    a percent of an overlap between the adjacent portions of the second fiber bundle in the second layer is greater in a place above the label than in a place other than the place above the label.

6. A method of manufacturing a gas tank, comprising the steps of:
    a step (a) of preparing a liner having a hollow cylindrical shape;
    a step (b) of forming a first layer including multiple layers by winding a first fiber bundle impregnated with resin around the liner, wherein the step (b) includes:
        a step (b-1) of forming an inner layer of the multiple layers; and
        a step (b-2) of forming an external layer of the multiple layers, the inner layer being closer than the external layer to the liner and the external layer being external to the inner layer, wherein in the step (b-2), the first fiber bundle is wound in such a manner so as to form a spaced-apart section of the external layer in which adjacent portions of the first fiber bundle are spaced apart by a gap;
    a step (c) of forming a second layer by winding a second fiber bundle impregnated with resin around the liner with the wound first fiber bundle in such a manner that portions of the second fiber bundle overlap each other in a direction parallel to a center axis of the liner in an overlapped section of the second layer;
    a step (d) of causing the overlapped section of the second layer to get into the spaced-apart section of the external first layer; and
    a step (e) of curing the resin.

7. The method of manufacturing a gas tank in accordance with claim 6, wherein
    the step (b-2) includes a step of forming a helical layer by winding the first fiber bundle by helical winding.

8. The method of manufacturing a gas tank in accordance with claim 6,
    the step (b-2) includes a step of forming a layer in which the resin in the first fiber bundle has a larger volume ratio than the resin in the first fiber bundle in the inner layer.

9. The method of manufacturing a gas tank in accordance with claim 6,
    the step (b-2) includes a step of winding the first fiber bundle by applying a tension lower than a tension applied to the first fiber bundle in the step (b-1).

10. The method of manufacturing a gas tank in accordance with claim 6, wherein
    the first fiber bundle is formed of carbon fibers, and
    the second fiber bundle is formed of glass fibers.

11. The method of manufacturing a gas tank in accordance with claim 6, comprising a step executed between the step (b) and the step (c) of affixing a label to a part of the first layer, wherein
    in the step (c), the second fiber bundle is wound in such a manner that a percent of an overlap between adjacent portions of the second fiber bundle in the second layer is greater in a place above the label than in a place other than the place above the label.

12. The method of manufacturing a gas tank in accordance with claim 6, wherein
the step (d) includes a step of housing the liner with the wound second fiber bundle in a housing of a curing device, applying heat to a softening temperature of the resin, and causing the overlapped section of the second layer to get into the first layer by pressing a surface of the second layer with an inner surface of the housing.

13. The method of manufacturing a gas tank in accordance with claim 6, wherein
the step (d) includes a step of causing the overlapped section of the second layer to get into the first layer by pressing a surface of the second surface with a flattening tool while applying heat.

* * * * *